April 25, 1950  G. A. ROBBINS  2,505,724
ANTISKID CHAIN CONNECTOR
Filed Nov. 6, 1945  2 Sheets-Sheet 1
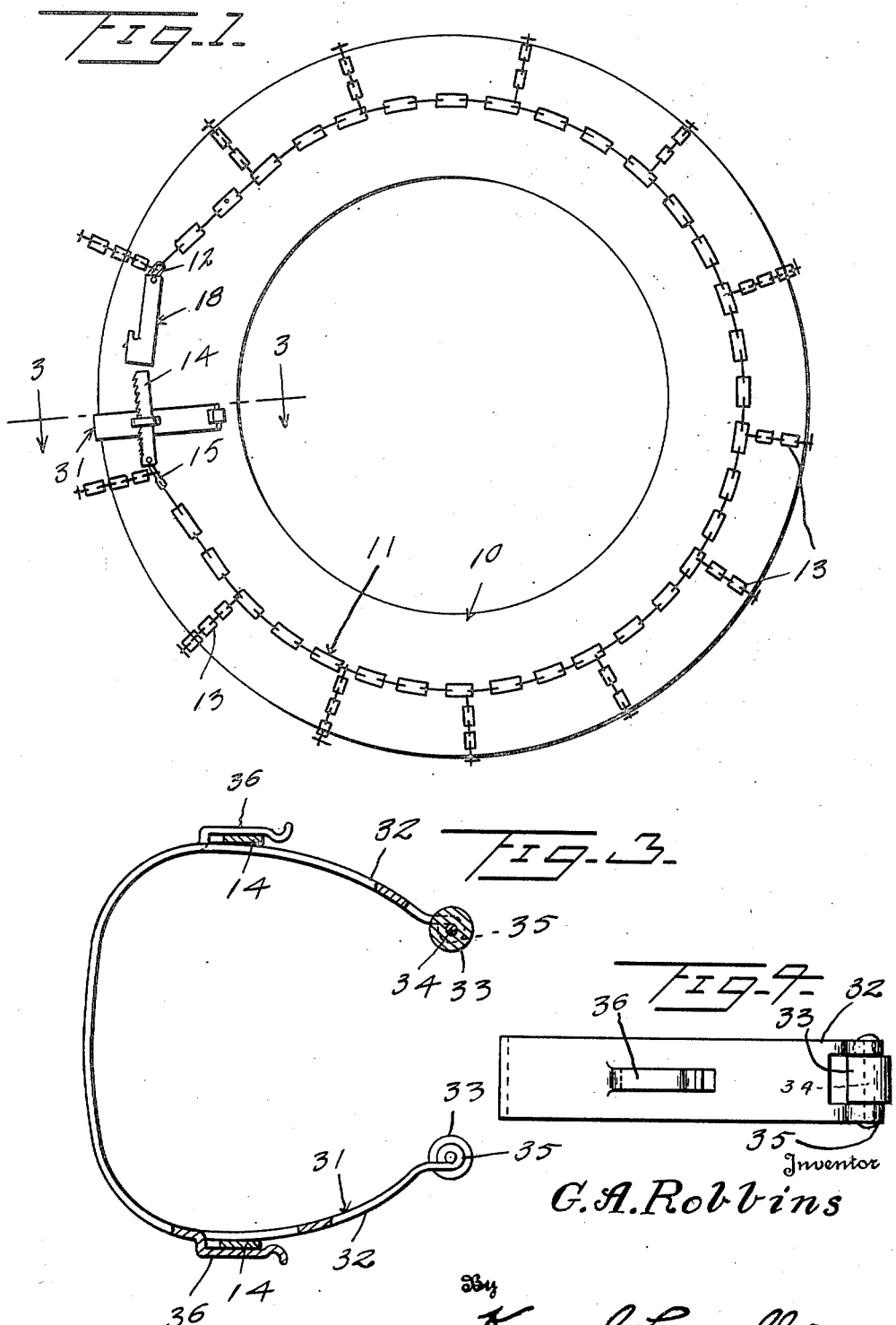
Inventor
G. A. Robbins
By
Kimmel & Crowell Attorneys

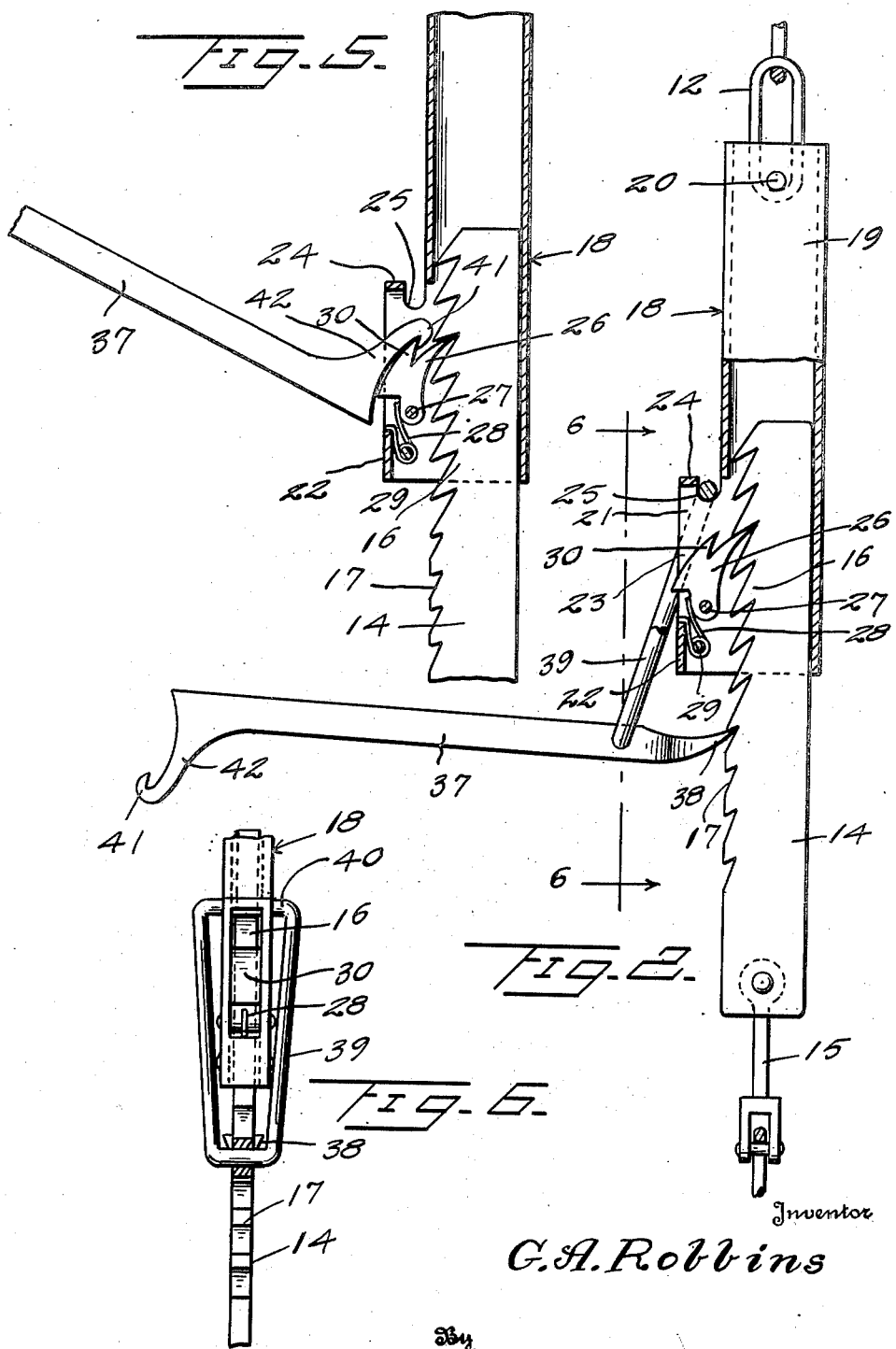

Patented Apr. 25, 1950

2,505,724

UNITED STATES PATENT OFFICE 2,505,724

ANTISKID CHAIN CONNECTOR

George A. Robbins, Dunbar, Pa.

Application November 6, 1945, Serial No. 626,987

1 Claim. (Cl. 152—242)

This invention relates to anti-skid chains.

An object of this invention is to provide in an anti-skid chain an improved means for releasably securing the ends of the side chains together.

Another object of this invention is to provide an improved means for mounting the chain on a tire.

A further object of this invention is to provide in an anti-skid chain an improved means whereby the side chains may be tensioned when in applied position.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail side elevation of an anti-skid chain construction according to an embodiment of this invention, Figure 2 is a fragmentary longitudinal section partly in side elevation of one of the connectors showing the tightening tool in operative position, Figure 3 is a sectional view taken on the line 3—3 of Figure 1, Figure 4 is a detail side elevation of the chain applying member, Figure 5 is a fragmentary sectional view similar to Figure 2 showing the use of the releasing tool, and Figure 6 is a fragmentary sectional view taken on the line 6—6 of Figure 2.

Referring to the drawings the numeral 10 designates generally a tire having mounted thereon an anti-skid chain generally designated as 11. The chain 11 includes a pair of side chains 12 and a plurality of tread or cross chains 13 connected between the side chains 12 and engageable over the tread of the tire 10.

In order to provide an improved means whereby the ends of each side chain 12 may be detachably coupled together and whereby the side chains 12 may be tightened and readily released I have provided an elongated bar 14 which is secured by means of a connector 15 to one of the side chain 12. The bar 14, as shown more clearly in Figure 2, is provided with two sets of teeth 16 and 17 in one lengthwise edge thereof. The opposite end of the side chain 12 has connected thereto a keeper, generally designated as 18. The keeper 18 is formed of a flat tubular member 19 within which the bar 14 is adapted to slidably engage. One end of the keeper 18 is connected to the adjacent end of the side chain 12 by means of a pin 20 extended through the side walls of the tubular member 19.

The side walls of the tubular member 19 at their inner ends are formed with offset extensions 21 connected together at their outer edges by an outer wall 22 which is shorter in length than the length of the extension 21, so as to thereby form an elongated slot 23. The inner ends of the extensions 21 are connected together by a connecting bar 24 and a recess or notch 25 is formed in the extensions 21 adjacent the connecting member 24, the purpose for which will be hereinafter described. A pawl 26 is loosely disposed between the two extensions 21 being pivotally mounted on a pivot member 27 extending between the extensions 21 and the pawl 26 is constantly urged into engagement with the teeth 16 by means of a spring 28 mounted on a pin 29. The pawl 26 is formed with a second tooth or releasing dog 30 by means of which a releasing tool may be applied to a second dog 30, so as to pull the pawl or dog 26 out of engagement with the teeth 16.

In applying the chain to the tire 10 the two toothed bars 14 are releasably clamped on an applying member which includes a substantially ovoidal resilient strip 31, which is bifurcated at the opposite ends thereof, as indicated at 32. A roller 33 is disposed between the bifurcations 32 being rotatably mounted on a shaft or pin 34 carried by the reversed ends 35 of the bifurcations 32. The resilient clamping member 31 is formed with a pair of resilient clips 36 which are struck outwardly on the opposite sides of the clamp so that the elongated bars 14 may be inserted in the clips 36 and held with the free ends thereof extending from the clamping member 31, as shown more clearly in Figure 1.

The keeper 18 is then slipped over the free end of the bar 14 as far as may be desired so as to substantially tighten the side chain 12. After the keeper 18 is engaged with the bar or bolt 14 the clamping member 31 may be removed from the tire and disengaged from the bars or bolts 14. The bar 14 may be moved inwardly with respect to the keeper 18 so to more tightly position the side chain about the tire by means of an elongated lever 37 which is formed with a bill 38 at one end thereof engageable with the teeth 17. The teeth 17 are substantially shallow whereas the teeth 16 are relatively deep. The lever 37 has loosely mounted thereon a looped member 39 which is adapted to have the outer end 40 thereof engaged within the notches 25 of the side extension members 21, as shown more clearly in Figure 2. The lever 37 may then be rocked downwardly as viewed in Figure 2 whereupon the dog 26 will constitute a holding dog for holding the bar 14 in any endwise position determined by rocking of the chain tensioning lever 37.

When it is desired to release the side chain and release the dog 26 from the toothed bar 14 the lever 37 is reverted. The opposite end of the lever 37 is provided with a hook 41 carried by an arcuate shank 42 extending laterally from the lever 37. The hook 41 is adapted to engage the releasing dog 30 as shown in Figure 5, so that forcible rocking downwardly as viewed in Figure 5 of the lever 37 will pull the dog 26 out of engagement with the teeth 16.

With a skid chain as hereinbefore described and the applying means for the chain, the latter may be easily and quickly mounted on or removed from the tire. The clamping member 31 may be forced onto the tire and then the bars 14 inserted in the clips 36 with the teeth on these bars disposed outwardly. The tire may then be rolled over the ground for substantially one turn, whereupon the keeper members 18 may be slipped over the extended ends of the bars 14, the keeper members 18 being latched on the bars 14 by the spring pressed dogs 26. After the chain has been initially loosely mounted on the tire the clamping member 31 may be disengaged from the bars 14 and the bars 14 moved additionally into the keepers 18 by the lever 37 as hereinbefore described.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claim.

What I claim is:

In an anti-skid chain formed of a pair of side chains and a plurality of tread chains; connectors for releasably coupling the ends of said side chains together, each of said connectors comprising an elongated bar having one end thereof secured to an end of one of the side chains and formed with a toothed longitudinal edge, a tubular keeper having one end thereof secured to the other end of said one of the side chains, said bar being slidable in said keeper, said keeper being formed with outwardly extending side walls adjacent the other end of said keeper, a spring pressed rockable pawl journalled between said outwardly extending side walls and engageable with said toothed edge for holding said bar in endwise adjusted position, a releasing dog formed on the outer edge of said pawl, an opening formed in the outer wall of said keeper in the area of said outwardly extended side walls and outwardly of said pawl through which a pawl releasing tool may be extended for engagement with said dog and rocking of said pawl out of engagement with said toothed edge, and notches formed in said outwardly extending side walls and opening in the direction of said one end of said keeper within which a spanning tool may be anchored for urging said bar into said keeper.

GEORGE A. ROBBINS.

REFERENCES CITED

The following references are of record in the file of this patent:

UNITED STATES PATENTS

| Number | Name | Date |
| --- | --- | --- |
| 219,740 | Kirkwood | Sept. 16, 1879 |
| 1,475,065 | Gilbertson | Nov. 20, 1923 |
| 1,627,776 | Haumerson | May 10, 1927 |
| 1,661,707 | Small | Mar. 6, 1928 |
| 1,745,273 | Romain | Jan. 28, 1930 |
| 1,801,159 | Hunter | Apr. 14, 1931 |
| 1,806,840 | Campbell | May 26, 1931 |
| 2,245,902 | Cohn | June 17, 1941 |